US008363233B2

(12) United States Patent
Yamada

(10) Patent No.: US 8,363,233 B2
(45) Date of Patent: Jan. 29, 2013

(54) IMAGE PROCESSING APPARATUS, CONTROL METHOD, PROGRAM, AND STORAGE MEDIUM

(75) Inventor: Kaori Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1109 days.

(21) Appl. No.: 11/275,679

(22) Filed: Jan. 24, 2006

(65) Prior Publication Data

US 2006/0171732 A1 Aug. 3, 2006

(30) Foreign Application Priority Data

Jan. 28, 2005 (JP) ................................ 2005-021822

(51) Int. Cl.
*G06F 3/12* (2006.01)

(52) U.S. Cl. ..................... 358/1.13; 358/1.15; 358/1.16; 399/75; 715/700

(58) Field of Classification Search ................. 358/1.15, 358/1.16
See application file for complete search history.

(56) References Cited

U.S. PATENT DOCUMENTS

| | | | | |
|---|---|---|---|---|
| 6,336,149 | B1 | 1/2002 | Preston | 710/1 |
| 6,404,441 | B1 | 6/2002 | Chailleux | 715/704 |
| 6,690,392 | B1 | 2/2004 | Wugoski | 345/744 |
| 6,710,769 | B2 * | 3/2004 | Loughran et al. | 345/168 |
| 2001/0006586 | A1 * | 7/2001 | Day et al. | 400/76 |
| 2001/0035972 | A1 * | 11/2001 | Wurmfeld | 358/1.13 |
| 2002/0015598 | A1 * | 2/2002 | Maeda et al. | 399/81 |
| 2003/0023952 | A1 * | 1/2003 | Harmon, Jr. | 717/106 |
| 2004/0080546 | A1 * | 4/2004 | Fritz | 345/826 |
| 2004/0184043 | A1 * | 9/2004 | Hirosugi et al. | 358/1.1 |
| 2004/0228645 | A1 * | 11/2004 | Kato | 399/81 |
| 2005/0278728 | A1 * | 12/2005 | Klementiev | 719/328 |
| 2006/0028690 | A1 * | 2/2006 | Kunori | 358/401 |
| 2006/0087680 | A1 * | 4/2006 | Maeda | 358/1.15 |

FOREIGN PATENT DOCUMENTS

| | | |
|---|---|---|
| EP | 0322333 B1 | 5/1994 |
| EP | A 0 621 527 A1 | 10/1994 |
| JP | 1-295274 | 11/1989 |
| JP | 01-295274 | 11/1989 |
| JP | 2000-341445 | 12/2000 |

(Continued)

OTHER PUBLICATIONS

McComb, Gordon, Wordperfect 5.1 Macros and Templates, Electronic Edition, Chapter 2.*

(Continued)

*Primary Examiner* — Marivelisse Santiago Cordero
*Assistant Examiner* — Kent Yip
(74) *Attorney, Agent, or Firm* — Fitzpatrick, Cella, Harper & Scinto

(57) ABSTRACT

To facilitate setting information input by the user of an image processing apparatus, there is provided a control method that includes inputting setting information for each function of the apparatus on a displayed screen, and, when the user issues a recording instruction, storing the input setting information in correspondence with the function, and, in a case where the user issues a recording stop instruction, storing stop information in correspondence with the function. Setting control of setting information is commenced for each function in response to a setting instruction from the user, in a case where the setting information has been stored, control is performed to set the setting information, and when the stop information has been stored, input of setting information by the user is awaited and then the setting information is set.

4 Claims, 18 Drawing Sheets

FOREIGN PATENT DOCUMENTS

| | | |
|---|---|---|
| JP | 2002-341445 | 12/2000 |
| JP | A 2002-142056 | 5/2002 |
| JP | A 2002-323946 | 11/2002 |

OTHER PUBLICATIONS

International Business Machine, Corporation, "IBM WebSphere Host-On-Demand Version 8.0, Host-On-Demand Macro Programming Guide," Sep. 2003, pp. 10 and 27.

Chen Quanshu, "Probe into Lotus 1-2-3 Macro", Computer and Teaching Research Office, Kunming Engineering Institute, pp. 49-53 (Feb. 1988) (English translation provided).

Three Office Actions and Search Reports from Chinese (PRC), Japanese and EPO counterparts of in PRC counterpart of USPAP 2006/0028690, of record herein; dates Sep. 7, 2007 (China; with partial translation), May 14, 2007 (Japan), and Nov. 30, 2005 (EPO).

* cited by examiner

FIG. 11

1100

| FUNCTION (1101) | DETAILED FUNCTION (1102) | SETTINGS (1103) | STOP (1104) |
|---|---|---|---|
| BOTH SIDES | TYPE OF BOTH SIDES | FROM BOTH SIDES TO BOTH SIDES | |
| | DOCUMENT ORIENTATION | – | ○ |
| | OUTPUT ORIENTATION | HORIZONTAL SPREAD | |
| ⋮ | ⋮ | ⋮ | ⋮ |

FIG. 13

1300

| FUNCTION (1301) | DETAILED FUNCTION (1302) | WINDOW (1303) | PREVIOUS WINDOW (1304) |
|---|---|---|---|
| BOTH SIDES | TYPE OF BOTH SIDES | FIRST WINDOW FOR BOTH SIDES | – |
| | DOCUMENT ORIENTATION | SECOND WINDOW FOR BOTH SIDES | FIRST WINDOW FOR BOTH SIDES |
| | OUTPUT ORIENTATION | THIRD WINDOW FOR BOTH SIDES | SECOND WINDOW FOR BOTH SIDES |
| . . . | . . . | . . . | . . . |

FIG. 17

1700

| FUNCTION | DETAILED FUNCTION | SETTINGS | STOP |
|---|---|---|---|
| A | A–1 | aaa | |
| | A–2 | bbb | ○ |
| | A–4 | ccc | |
| . . . | . . . | . . . | . . . |

FIG. 18

1800

| FUNCTION | DETAILED FUNCTION | WINDOW | PREVIOUS WINDOW |
|---|---|---|---|
| A | A–1 | FIRST WINDOW FOR A | – |
| | A–2 | SECOND WINDOW FOR A | FIRST WINDOW FOR A |
| | A–3 | THIRD WINDOW FOR A | SECOND WINDOW FOR A |
| | A–4 | FOURTH WINDOW FOR A | THIRD WINDOW FOR A |
| . . . | . . . | . . . | . . . |

IMAGE PROCESSING APPARATUS, CONTROL METHOD, PROGRAM, AND STORAGE MEDIUM

FIELD OF THE INVENTION

The present invention relates to a processing technique in an image processing apparatus which has a plurality of functions for image processing and performs the processing using setting information set for each function.

BACKGROUND OF THE INVENTION

With recent functional advances in image processing apparatuses, the user operation of inputting setting values has become complicated. To facilitate the setting value input operation, various methods have been proposed.

For example, Japanese Patent Laid-Open No. 1-295274 proposes a method of storing setting values input by the user in advance as a file and invoking the file in image processing. Japanese Patent Laid-Open No. 2000-341445 proposes a method of, when inputting setting values, recording input operation performed by the user using a so-called macro function, and reproducing the input operation in image processing.

When, for example, only some setting items to be input are to be changed and set, the method in Japanese Patent Laid-Open No. 1-295274 requires an operation of storing the target setting items (those that are to be changed) as a separate file. According to the method in Japanese Patent Laid-Open No. 2000-341445, the target setting items must be recorded by additionally performing an input operation. These requires degrade user friendliness, and it is desired to facilitate input operation by the user even in this case.

The above methods cannot apply a file stored in a specific image processing apparatus to an image processing apparatus having different functions, or reproduce an input operation recorded by a specific image processing apparatus in an image processing apparatus having different functions. The user must execute the setting value input operation again for an image processing apparatus having different functions, resulting in poor user friendliness.

SUMMARY OF THE INVENTION

The present invention has been made to solve the conventional drawbacks, and has as its object to facilitate setting value input operation by the user in an image processing apparatus and improve user friendliness.

To achieve the above object, an image processing apparatus is provided that comprises a display unit configured to display a screen in accordance with a predetermined display order, a setting information input unit that accepts an input of setting information to be set for executing one of the functions, on one of the operation screens displayed in accordance with the predetermined display order, and a storage unit, if a user issues a storing instruction, stores the accepted setting information. If the user does not issue a storing instruction when the setting information input unit accepts an input of setting information on any of the plurality of operation screens, however, the storage unit does not store the accepted setting information. Also provided in the apparatus is a setting control unit, which starts setting control of setting information for each function in response to a setting instruction from the user. In a case where an operation screen, on which the accepted setting information has been stored in the storage unit, is displayed, the setting control unit controls to set the stored setting information, while if an operation screen on which the accepted setting information has not been stored in the storage unit is displayed, then the setting control unit controls to prompt the user to input setting information.

The present invention facilitates setting value input operation by the user in an image processing apparatus, and improves user friendliness.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a table showing the configuration of user registration contents;

FIG. 13 is a table showing the configuration of copying machine registration contents;

FIG. 17 is a table showing the configuration of user registration contents; and FIG. 18 is a table showing the configuration of copying machine registration contents.

DETAILED DESCRIPTION OF THE PREFERRED EMBODIMENTS

Preferred embodiments of the present invention will now be described in detail in accordance with the accompanying drawings.

FIRST EMBODIMENT

1. Network Configuration

Figure 1:
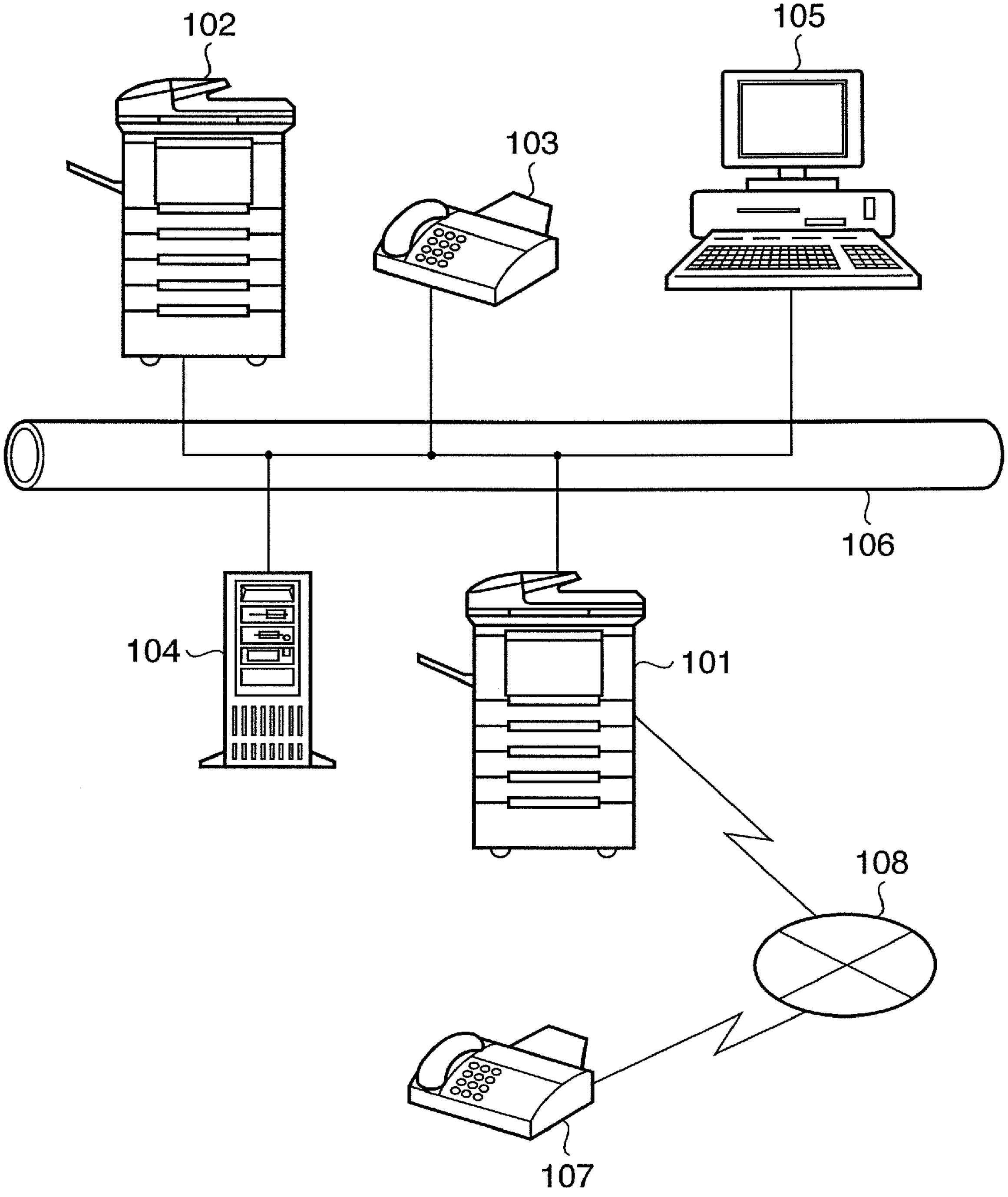
FIG. 1 is a view schematically showing the configuration of a network having an image processing apparatus (copying machine) according to an embodiment of the present invention.

FIG. 1 is a view schematically showing the configuration of a network having an image processing apparatus (101) according to the first embodiment of the present invention. In the first embodiment, the image processing apparatus is a copying machine having a data transmission function.

In FIG. 1, reference numerals 101 and 102 denote copying machines having a data transmission function. The copying machines 101 and 102 are connected to a facsimile apparatus 103, database/mail server 104, and client computer 105 via a LAN 106 so that the copying machines 101 and 102 can communicate with them. The copying machine 101 is connected to a facsimile apparatus 107 via a public line 108.

The copying machine 101 has a scanner function and facsimile function. Also, the copying machine 101 has a data transmission function of reading a document image, and transmitting, to apparatuses on the LAN 106, image data generated by reading the document image. Note that the apparatuses on the LAN 106 are the copying machine 102, facsimile apparatus 103, database/mail server 104, and client computer 105.

The copying machine 101 has a PDL function, and can receive a PDL image designated by the client computer 105 connected to the LAN 106 and print the PDL image.

Figure 2:
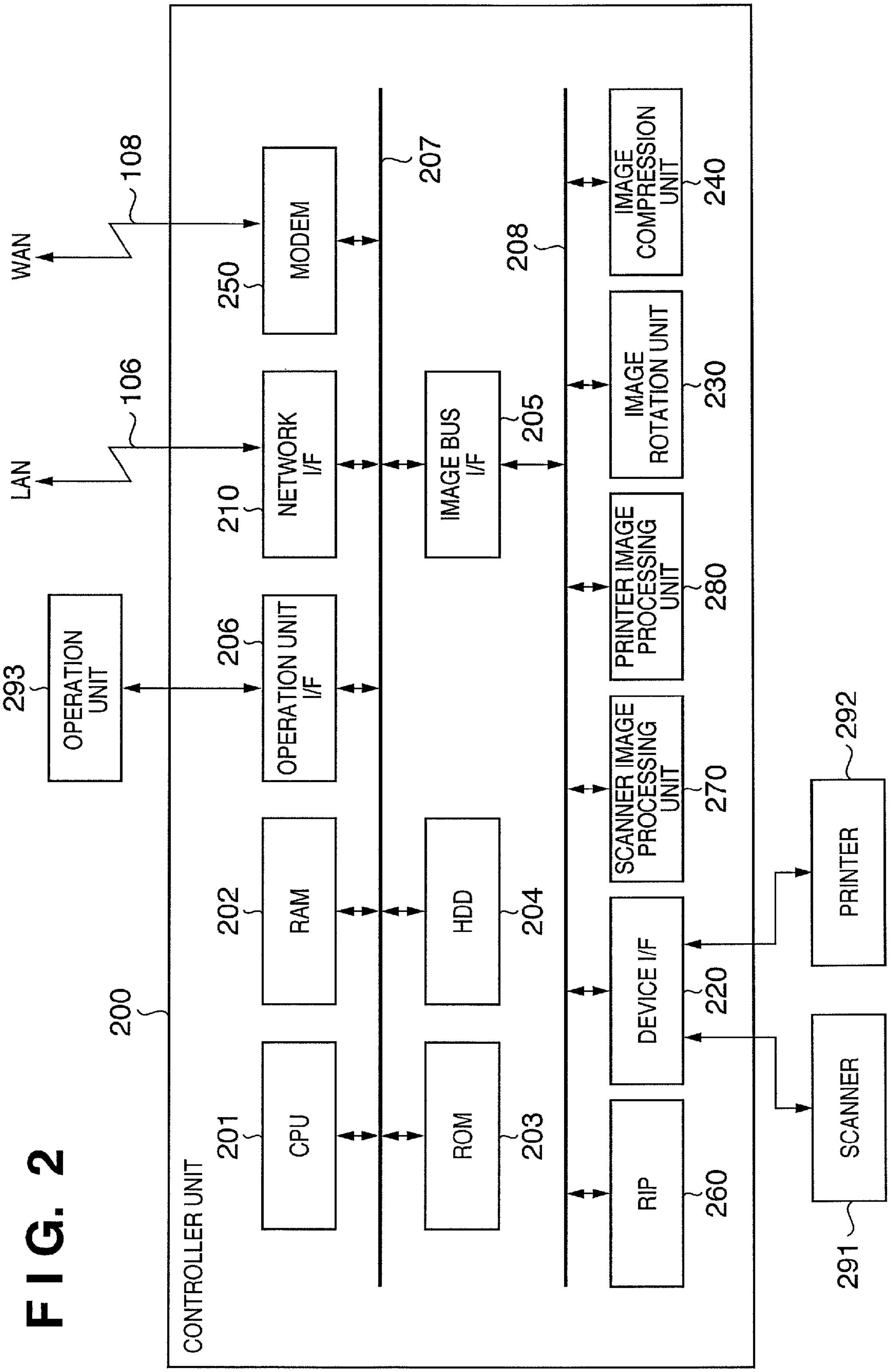
FIG. 2 is a block diagram showing the configuration of the main part of the copying machine.

Further, the copying machine 101 has a personal box function. With the personal box function, an image read by the copying machine 101, or a PDL image designated by the client computer 105 connected to the LAN 106 can be saved as a scanner job or PDL job in a designated box area of an HDD (Hard Disk Drive) 204 (FIG. 2). The scanner job or PDL job saved in the box area can also be printed. Similarly, data read by the copying machine 102 can be received via the LAN 106 to save the received data as a reception job in the HDD 204 of the copying machine 101, and also to print out the data. Contents received from the public line 108 via a Web browser can be saved as a browser job in the copying machine 101 and printed out.

The facsimile apparatus 103 can receive data read by the copying machine 101 via the LAN 106, and transmit the received data.

The database/mail server 104 is a server apparatus having a function of receiving, via the LAN 106, data read by the copying machine 101, storing the data in a database, and transmitting the data as E-mail.

The client computer 105 is connected to the database/mail server 104, and can acquire desired data from the database/mail server 104 and display the acquired data. The client computer 105 can also receive, via the LAN 106, data read by the copying machine 101, and process and edit the received data.

The facsimile apparatus 107 has a facsimile function, and can receive, via the public line 108, data read by the copying machine 101 and print out the received data.

2. Block Diagram of Main Configuration

FIG. 2 is a block diagram showing the configuration of the main part of the copying machine 101 according to the first embodiment. In FIG. 2, reference numeral 200 denotes a controller unit which is connected to a scanner 291 serving as an image input device and a printer 292 serving as an image output device. The controller unit 200 performs control of implementing a copy function of printing out image data read by the scanner 291 from the printer 292. When the controller unit 200 is connected to the LAN 106 or public line (WAN) 108, it performs control of inputting and outputting image data, Web contents, and various kinds of device information.

The controller unit 200 has a CPU 201. The CPU 201 activates an operating system (OS) by a boot program stored in a ROM 203, and executes an application program stored in the HDD (Hard Disk Drive) 204 on the OS. In response to this, the controller unit 200 executes various processes. As a work area for the CPU 201, a RAM 202 is used. In addition to the work area, the RAM 202 provides an image memory area for temporarily storing image data. The HDD 204 stores image data together with the application program.

The CPU 201 is connected to an operation unit I/F (operation unit interface) 206 via a system bus 207 in addition to the ROM 203 and RAM 202. The CPU 201 is also connected to a network I/F (network interface) 210, modem 250, and image bus I/F (image bus interface) 205.

The operation unit I/F 206 is an interface with an operation unit 293 having a touch panel. The operation unit I/F 206 outputs, to the operation unit 293, image data to be displayed on the operation unit 293. The operation unit I/F 206 sends, to the CPU 201, information (setting information and the like) input by the user from the operation unit 293.

The network I/F 210 is connected to the LAN 106, and inputs/outputs, via the LAN 106, information between apparatuses on the LAN 106. The modem 250 is connected to the public line 108, and inputs/outputs information via the public line 108.

The image bus I/F 205 is a bus bridge which connects the system bus 207 and an image bus 208 for transferring image data at high speed, and converts a data structure. The image bus 208 is formed from a PCI bus or IEEE1394. A raster image processor (to be referred to as a RIP hereinafter) 260, device I/F 220, scanner image processing unit 270, printer image processing unit 280, image rotation unit 230, and image compression unit 240 are connected to the image bus 208.

The RIP 260 rasterizes a PDL code into a bitmap image. The device I/F 220 is connected to the scanner 291 and printer 292, and performs synchronous/asynchronous conversion of image data. The scanner image processing unit 270 corrects, processes, and edits image data input to the scanner 291. The printer image processing unit 280 executes correction and resolution conversion for image data printed out via the printer 292. The image rotation unit 230 rotates image data. The image compression unit 240 converts multilevel image data into JPEG data, and binary image data into compressed data (e.g., JBIG, MMR, or MH data). The image compression unit 240 also decompresses compressed data.

3. Hardware Configuration

Figure 3:
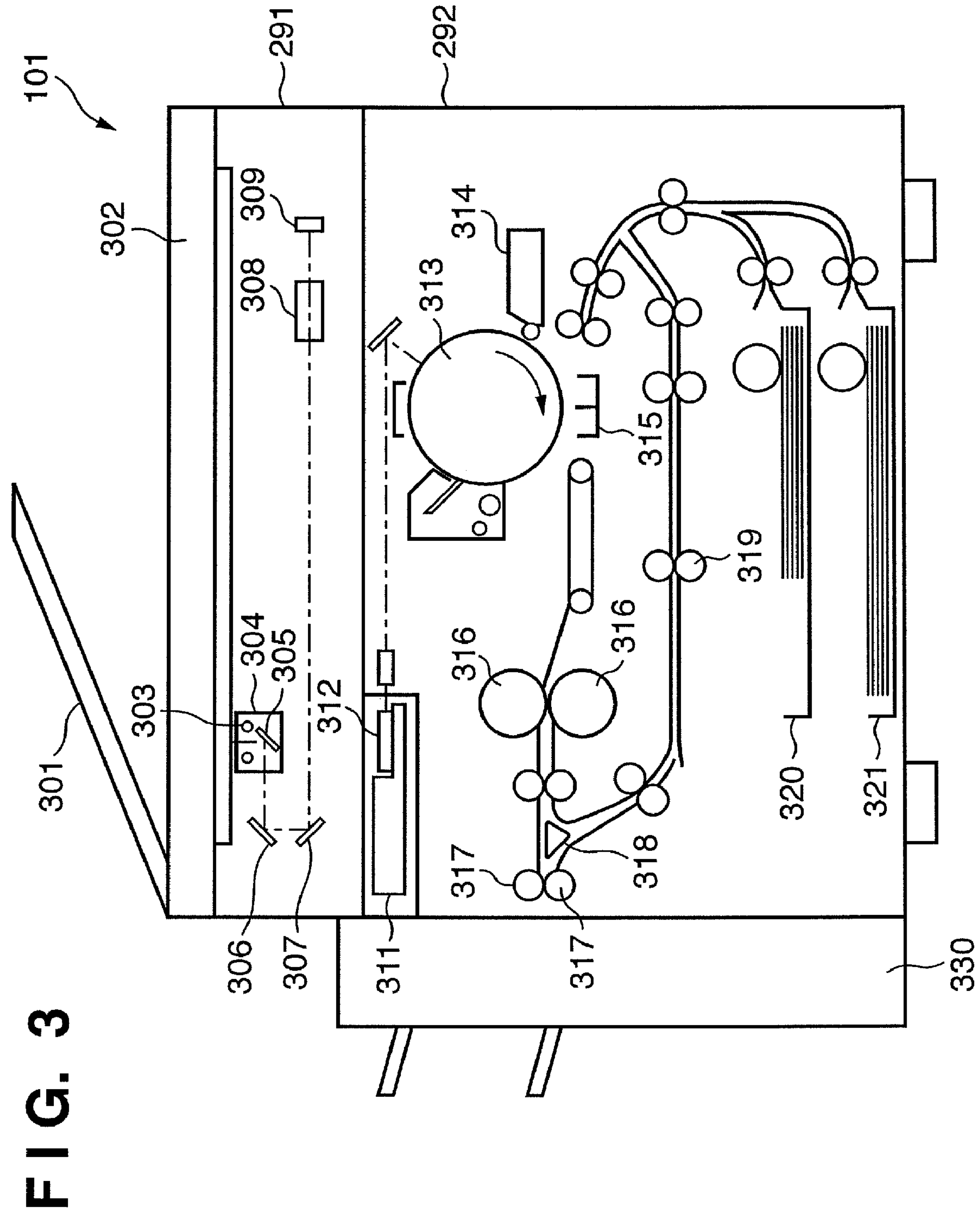
FIG. 3 is a sectional view schematically showing the hardware configurations of the scanner and printer of the copying machine.

FIG. 3 is a sectional view schematically showing the hardware configurations of the scanner 291 and printer 292 of the copying machine 101 in FIG. 1.

As shown in FIG. 3, the scanner 291 and printer 292 are integrated. The scanner 291 is equipped with a document feed unit 301. The document feed unit 301 feeds document sheets one by one from the first sheet onto a platen glass 302, and every time one of the document sheets is read, discharges it from the platen glass 202 to a discharge tray (not shown).

When a document is fed onto the platen glass 302, the scanner 291 turns on a lamp 303, and actuates a moving unit 304. As the moving unit 304 moves, the document on the platen glass 302 is read and scanned. During read scanning, light reflected by the document is guided to a CCD image sensor (to be referred to as a "CCD" hereinafter) 309 by mirrors 305, 306, and 307 and a lens 308. The image on the document is formed onto the image sensing plane of the CCD 309. The CCD 309 converts the image formed on the image sensing plane into an electrical signal, which undergoes predetermined processing and then is input to the controller unit 200 (not shown in FIG. 3).

The printer 292 has a laser driver 311. The laser driver 311 drives a laser-emitting unit 312 on the basis of image data input from the controller unit 200. The laser-emitting unit 312 emits a laser beam corresponding to image data. A photosensitive drum 313 is irradiated with the scanned laser beam.

An electrostatic latent image is formed by the irradiated laser beam on the photosensitive drum 313, and visualized as a toner image by toner supplied from a developing unit 314. In synchronism with the laser beam irradiation timing, a print sheet is fed between the photosensitive drum 313 and a transfer unit 315 from a cassette 320 or 321 via a convey path. The toner image on the photosensitive drum 313 is transferred onto the print sheet fed to the transfer unit 315.

The print sheet bearing the toner image is conveyed to a pair of fixing rollers (heating roller and press roller) 316 via a convey belt. The pair of fixing rollers 316 thermally press the print sheet to fix the toner image onto the print sheet. The print sheet having passed through the pair of fixing rollers 316 is delivered to a delivery unit 330 via a pair of deliver rollers 317. The delivery unit 330 is formed from a sheet processing apparatus capable of performing post-processes such as sorting and stapling. When a both-side printing mode is set, the rotational direction of the pair of deliver rollers 317 is reversed to guide the print sheet to a refeed convey path 319 by a flapper 318. The print sheet guided to the refeed convey path 319 is fed again between the photosensitive drum 313 and the transfer unit 315 at the above-mentioned timing, and a toner image is transferred to the reverse side of the print sheet.

4. Outer Appearance of Operation Unit

Figure 4:
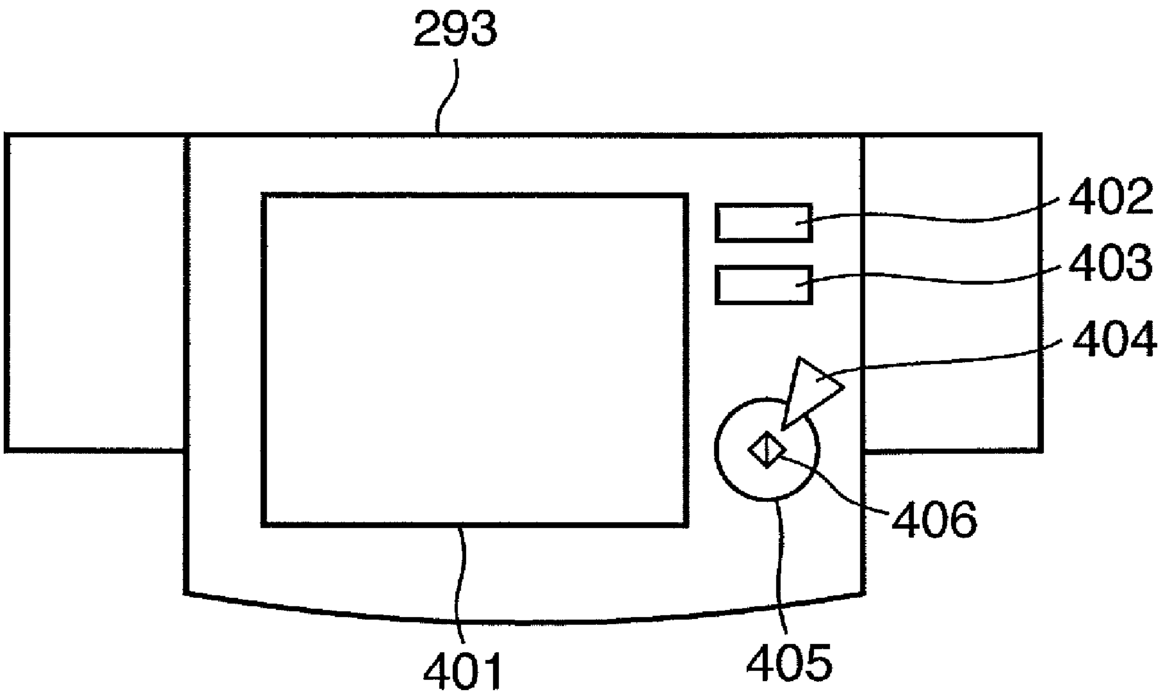
FIG. 4 is a view showing the outer appearance of the operation unit of the copying machine.

FIG. 4 shows the outer appearance of the operation unit 293. An LCD display 401 is covered with a touch panel sheet on the LCD, and displays a system operation window. When a displayed key is pressed, the LCD display 401 notifies the CPU 201 of the controller unit 200 of position information of the key.

A start key 405 is used to start reading a document image by the scanner 291. An LED 406 in two colors, green and red in this embodiment, is arranged at the center of the start key 405, and the color of the LED 406 represents whether the start key 405 is available. A stop key 404 stops an operation in progress. An ID key 403 is used to input the user ID of the user. A reset key 402 is used to initialize settings from the operation unit 293.

5. Operation Window

Figure 5:
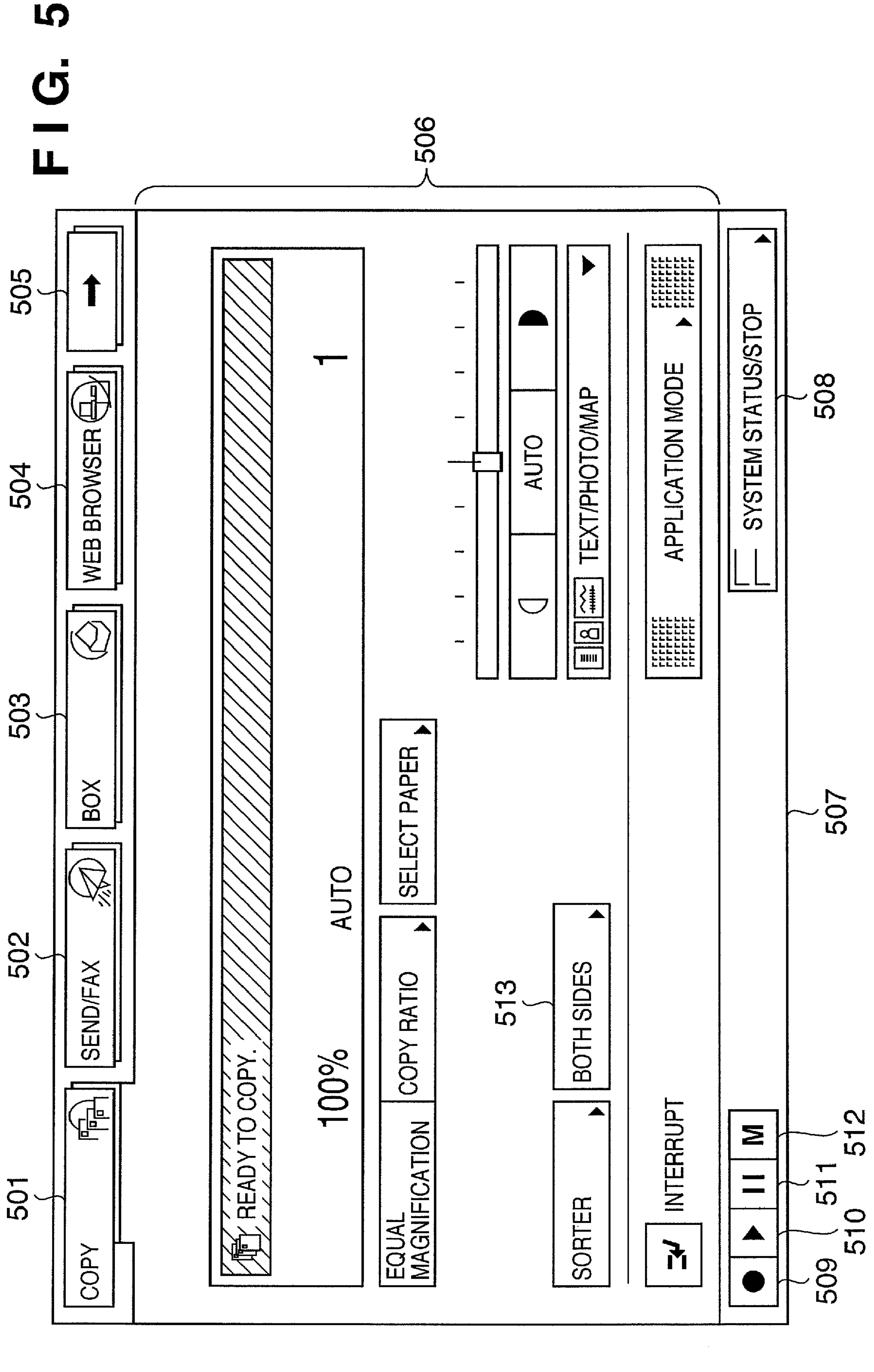
FIG. 5 is a view showing an example of an operation window (normal window) displayed on the LCD (liquid-crystal display) of the operation unit of the copying machine.

FIG. 5 is a view showing an example of an operation window displayed on the LCD display 401 of the operation unit 293.

As shown in FIG. 5, the upper portion of the operation window displays touch keys as tabs for a plurality of functions such as a copy key 501, send/FAX key 502, box key 503, and Web browser key 504.

FIG. 5 illustrates the initial window of the copy function displayed when the copy key 501 is pressed. As shown in FIG. 5, an initial window 506 of the copy function displays a status message ("ready to copy.") representing that the copy function can be executed. Below the message, a copy ratio, selected feed stage, and input numeric figure are displayed.

As touch keys for setting the operation mode of the copy function, an equal-magnification key, copy ratio key, paper selection key, sorter key, both-side key, and interrupt key are displayed. A text/photo/map key, a left arrow key to decrease density and a right arrow key to increase density for density adjustment, and an "auto" key for automatically adjusting density are displayed. To designate operation modes which cannot be displayed in the initial window, setting windows are hierarchically displayed in the window by pressing an application mode key.

A display area 507 displays the status of the copying machine 101, and displays, for example, an alarm message for jam or the like, and a status message representing that PDL printing is in progress when PDL printing is executed.

Reference numeral 508 denotes a system status/stop key which is pressed to display a window for displaying device information of the copying machine 101 or a window (not shown) for displaying a print job status. A job can be stopped via the window.

When the send/FAX key 502 is pressed, a setting window (not shown) for transmitting as E-mail an image read via the scanner 291 to a device on the LAN 106, or FTP-transmitting the image is displayed. Note that devices on the LAN 106 are the facsimile apparatus 103, database/mail server 104, client computer 105, and copying machine 102. This setting window also makes it possible to transmit a read image to the facsimile apparatus 107 via the public line 108.

When the box key 503 is pressed, an image read by the copying machine 101 is saved (registered) in a box area of the hard disk 204. Image data saved in the box area is designated and printed. Further, a setting window (not shown) for transmitting image data to a device on the LAN 106 is displayed.

When the controller unit 200 has five or more functions, a right arrow key 505 is displayed on the right side of the four, copy, send/FAX, box, and Web browser function keys.

Reference numeral 509 denotes a "trace start" key which is pressed to register setting information in a memory for each function. The "trace start" key can be pressed when the first window for in order to set setting information for each function is displayed. Reference numeral 510 denotes a "playback" key which is pressed to restart paused setting processing for setting information. Reference numeral 511 denotes a "pause" key which is pressed when target setting information is not uniquely determined Reference numeral 512 denotes a "mode memory" key, details of which will be described later.

6. Description of Copy Function

Of various functions of the copying machine 101, the "both sides" function of the copy function and detailed functions accessory to this function will be explained.

6.1 About "Both Sides" Function

The "both sides" function is a function of outputting a single- or both-side document on a single side or both sides, or a function of outputting a double-spread document such as a booklet on both sides. Target setting information of the "both sides" function includes the spread (vertical spread/horizontal spread) of a both-side document or the spread (vertical spread/horizontal spread) of a both-side output, details of which will be described below.

6.2 First Window for Both Sides

Figure 6:
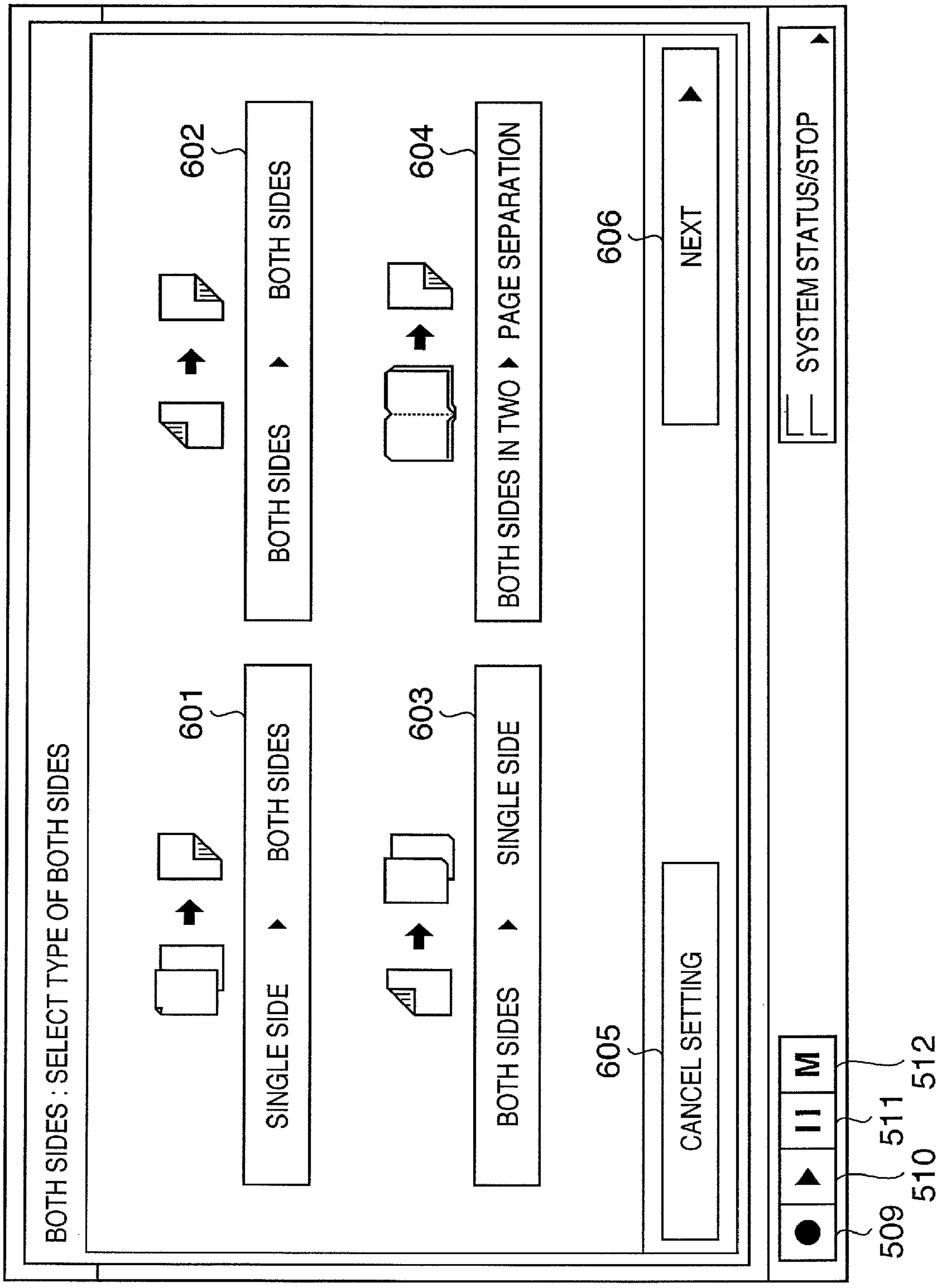
FIG. 6 is a view showing an example of the first window for both sides.

When a "both sides" key 513 among keys in the initial window 506 in FIG. 5 is pressed, a "first window for both sides" shown in FIG. 6 is displayed.

Keys 601 to 604 are used to select "type of both sides". The key 601 is used to set "from a single side to both sides", and pressed when a single-side document is output by both-side copying. The key 602 is used to set "from both sides to both sides", and pressed when a both-side document is output by both-side copying. The key 603 is pressed to set "from both sides to a single side", and pressed when a both-side document is output by single-side copying. The key 604 is used to set "both sides in two-page separation", and pressed when a double-spread document such as a booklet is output by both-side copying. Reference numeral 605 denotes a "setting cancel" key which is pressed when both-side setting is canceled. Reference numeral 606 denotes a "next" key which is pressed when the next setting of both-side setting is made.

6.3 Second Window for Both Sides

Figure 7:
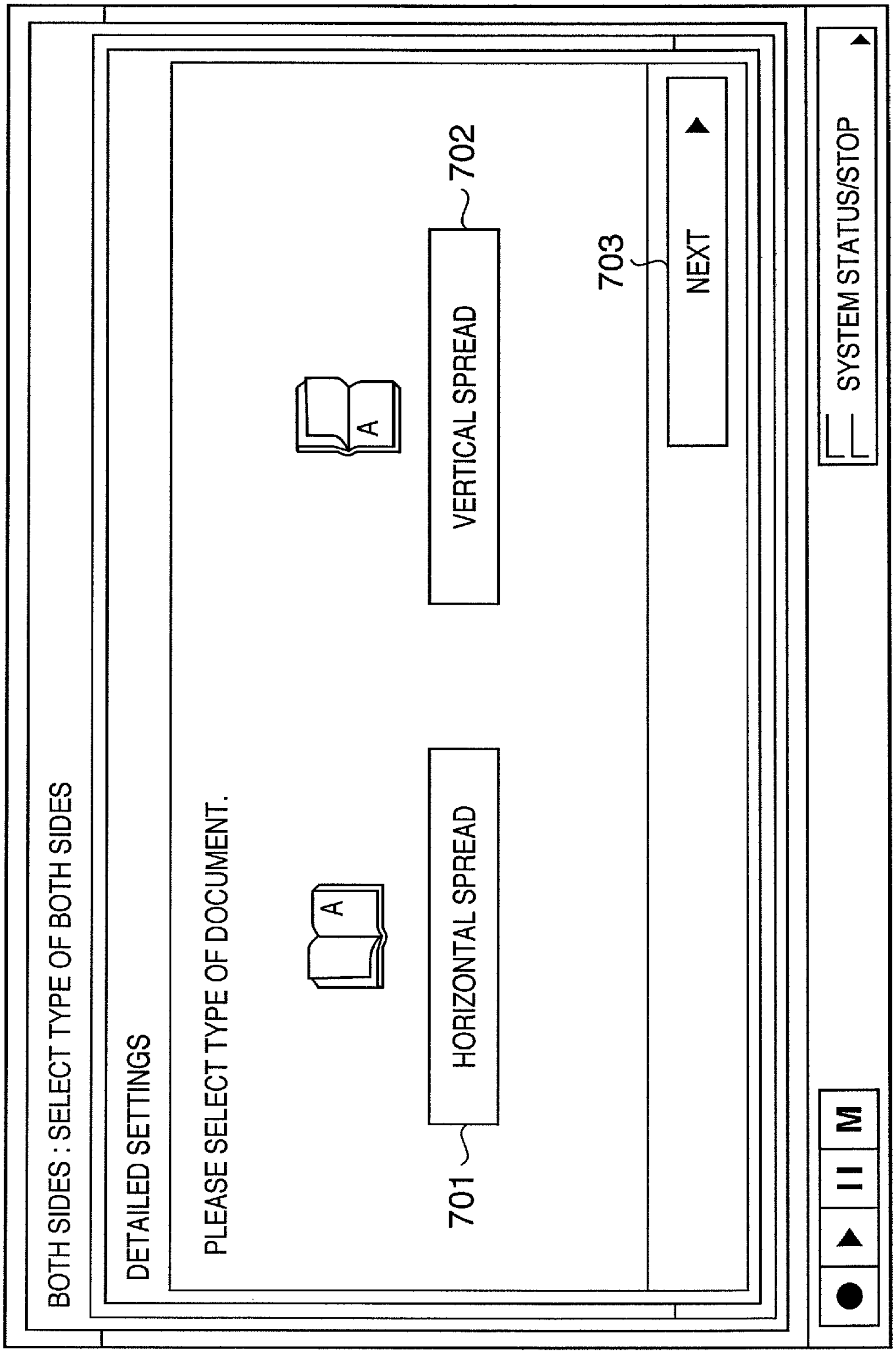
FIG. 7 is a view showing an example of the second window for both sides.

When the "from both sides to both sides" key 602 is pressed in the "first window for both sides" shown in FIG. 6 and then the "next" key 606 key is pressed, a "second window for both sides" shown in FIG. 7 is displayed. In this window, the double spread of a both-side document is set. Reference numeral 701 denotes a "horizontal spread" key which is selected when both-side document pages are laid out from side to side. Reference numeral 702 denotes a "vertical spread" key which is selected when both-side document pages are laid out up and down.

6.4 Third Window for Both Sides

Figure 8:
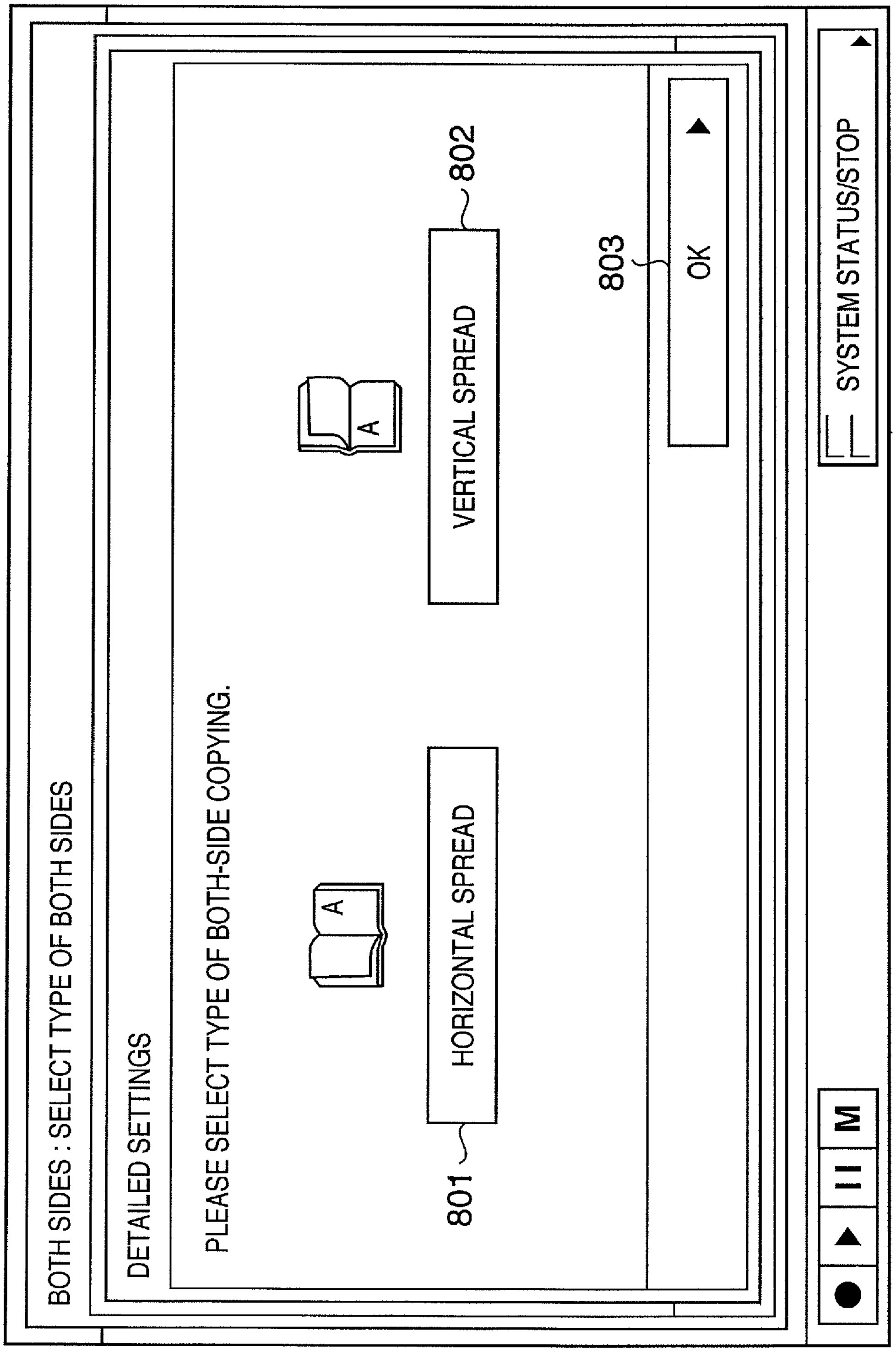
FIG. 8 is a view showing an example of the third window for both sides.

When a "next" key 703 is pressed in the "second window for both sides" shown in FIG. 7 is pressed, a "third window for both sides" shown in FIG. 8 is displayed. Reference numeral 801 denotes a "horizontal spread" key which is selected to lay out both-side outputs from side to side. Reference numeral 802 denotes a "vertical spread" key which is selected to lay out both-side outputs up and down. To finalize both-side settings, an "OK" key 803 is pressed.

7. Description of Registration Processing

Setting information registration/reproduction processing as a characteristic function of the copying machine 101 according to the first embodiment will be explained. Registration processing will be described by exemplifying a case wherein the "from both sides to both sides" key 602 is pressed and the both-side output setting (setting in FIG. 8) is fixed to "horizontal spread" though the spread setting of a both-side document (setting in FIG. 7) is not consistent.

7.1 Registration Processing

The "trace start" key 509 is pressed when the "first window for both sides" shown in FIG. 6 is opened. At this time, the "trace start" key 509 is hatched, and the "pause" key 511 can be pressed.

In this state, the "from both sides to both sides" key 602 is selected, and the "next" key 606 is pressed. At this time, if it is determined from the state of the "trace start" key 509 that the "trace start" key 509 has been pressed, setting contents in the window are temporarily finalized.

If the "next" key 606 is pressed, the "second window for both sides" shown in FIG. 7 is displayed. At this time, the "pause" key 511 is pressed, and then the "next" key 703 is pressed. It is determined that the "trace start" key 509 has not been pressed when the "next" key 703 is pressed. The process advances to the next operation without finalizing setting contents in the window.

After that, the "third window for both sides" shown in FIG. 8 is displayed. At this time, the "pause" key 511 can be pressed again (the "trace start" key 509 changes to pressed state). The "horizontal spread" key 801 and "OK" key 803 are pressed to temporarily finalize setting contents in the window and register setting information of the "both sides" function. In the same way, another function can be combined and registered.

Figure 9:
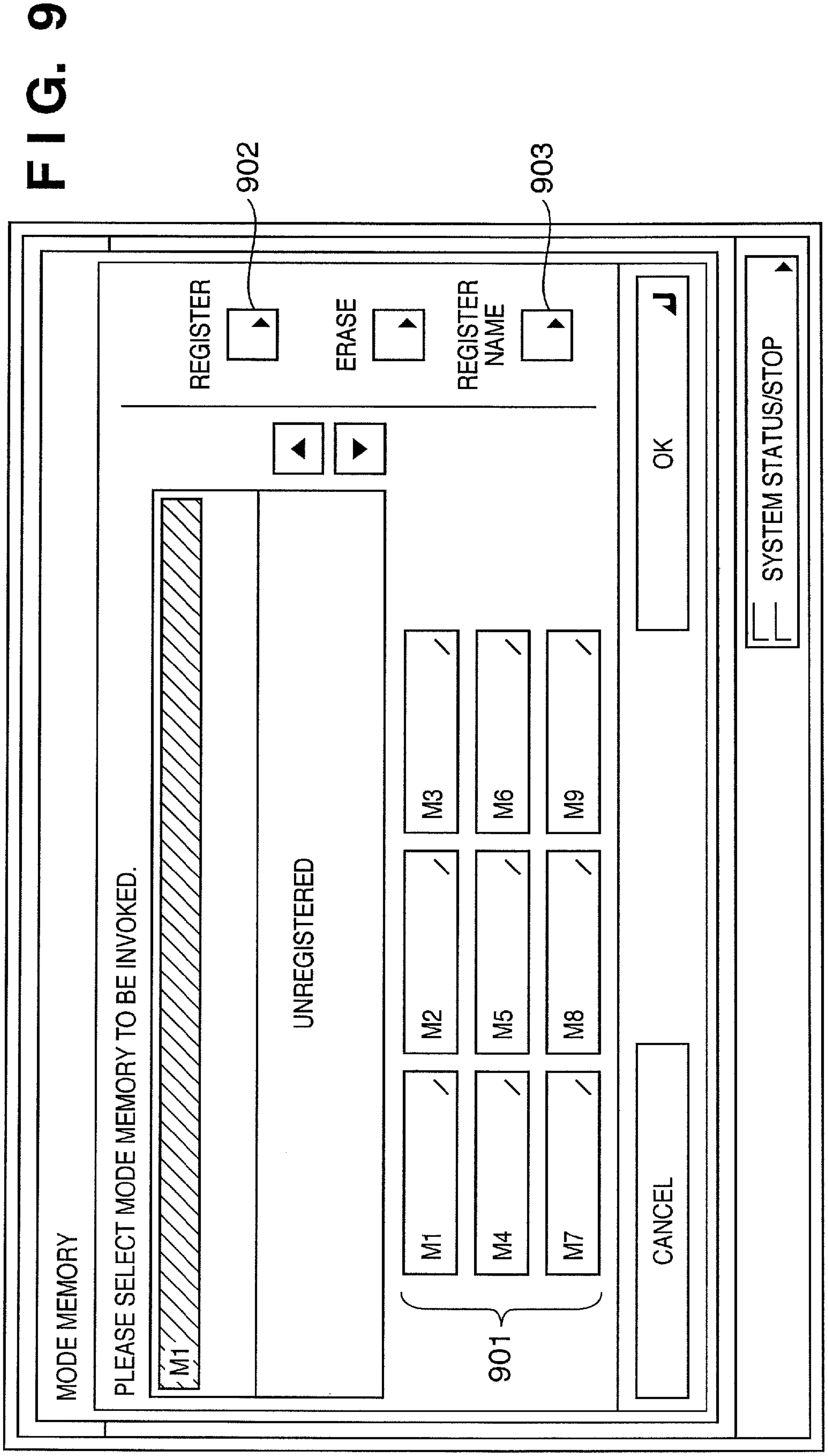
FIG. 9 is a view showing an example of the first window for registration.

After all settings are made, the "mode memory" key 512 in the copy function window is pressed. In response to the press of the "mode memory" key 512, a "first window for registration" shown in FIG. 9 is displayed. A key group 901 includes "memory" keys which allow registration of nine pieces of setting information. Reference numeral 902 denotes a "registration" key which is pressed when registered setting information is assigned to a key selected from the "memory" key group 901. Reference numeral 903 denotes a "name registration" key which is pressed when an arbitrary name is registered for a selected "memory" key.

A case wherein the both-side setting and another function are registered together will be explained. When an M1 key is selected and the "registration" key 902 is pressed, a "second window for registration" shown in FIG. 10 is displayed.

Figure 10:
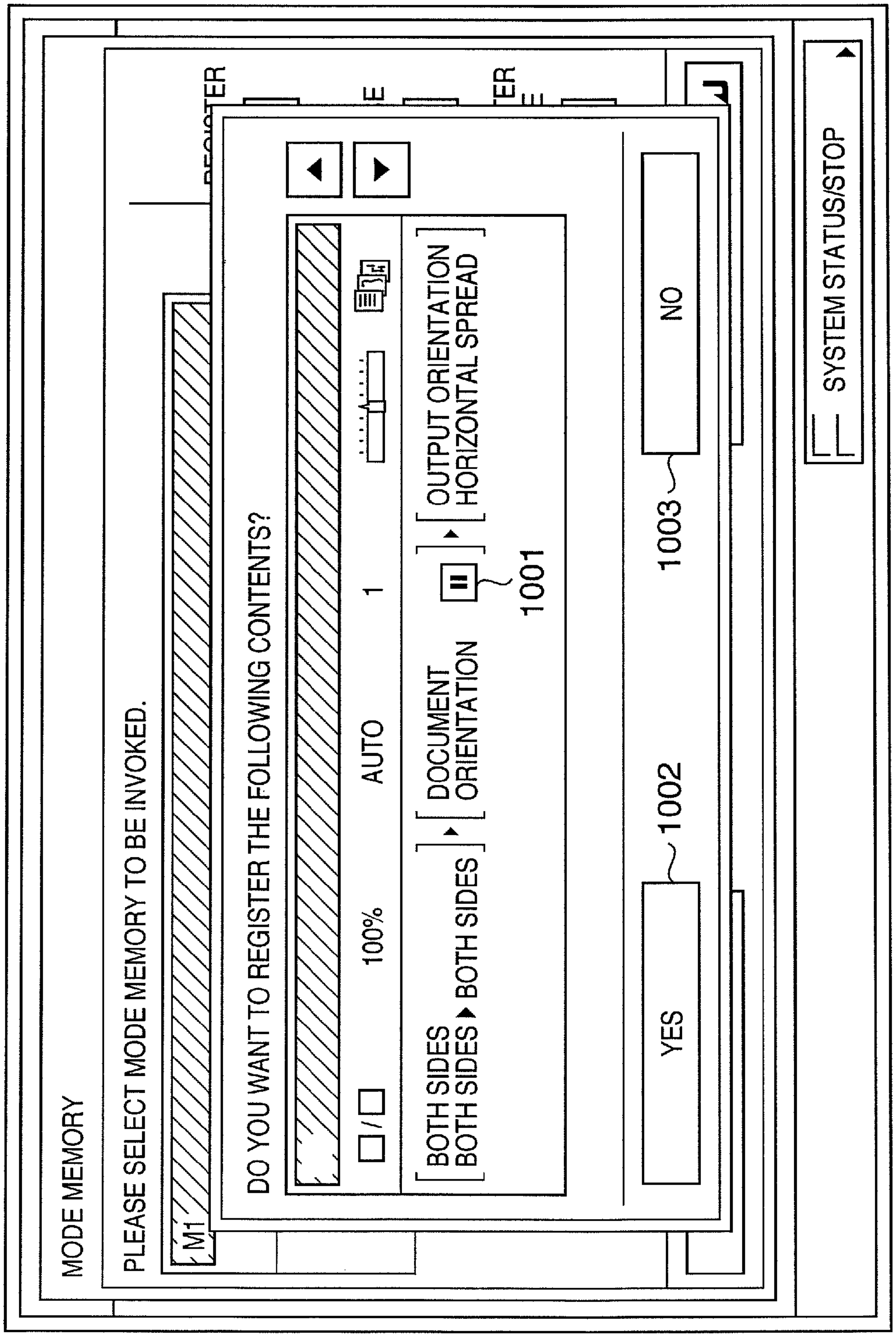
FIG. 10 is a view showing an example of the second window for registration.

In the "second window for registration" of FIG. 10, current settings are confirmed. Reference numeral 1001 denotes a pause position in a previously set document orientation. If this setting is OK, a "YES" key 1002 is pressed; if this setting is canceled, a "NO" key 1003 is pressed.

If the "YES" key 1002 is pressed, contents (user registration contents 1) shown in FIG. 11 are registered in the copying machine 101. User registration contents 1 (1100) include a function registration column 1101, and a detailed function registration column 1102 which describes "detailed functions" of a "function" registered in the function registration column 1101. User registration contents 1 (1100) also include a setting registration column 1103 which records "setting information" of the user for each detailed function, and a stop registration column 1104 which records "stop information" (information representing the stop of recording) set by the user for each detailed function.

7.2 Reproduction Processing of Registered Contents

Figure 12:
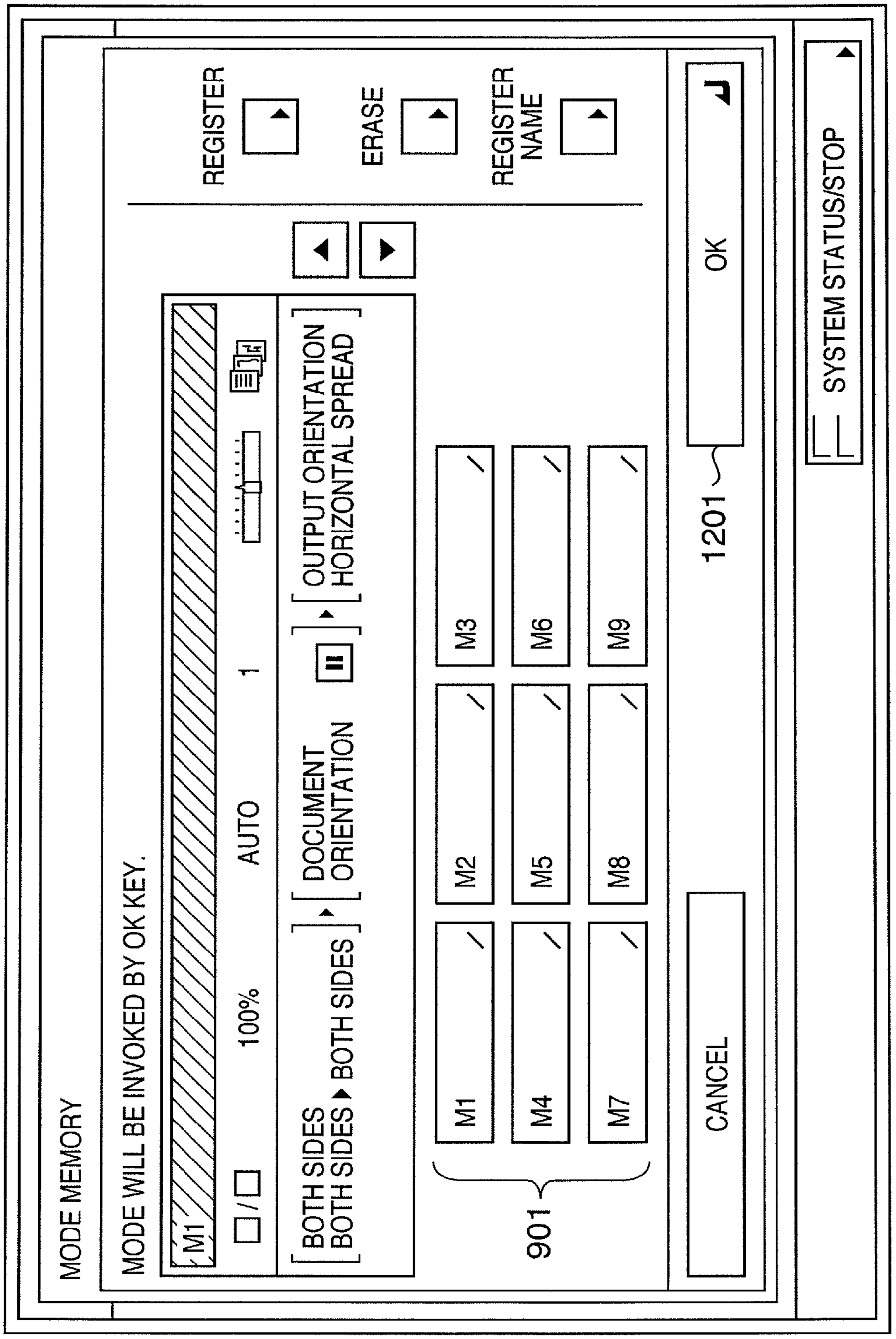
FIG. 12 is a view showing an example of the first window for invoke.

Reproduction processing for registered contents will be explained. When the "mode memory" key 512 in the copy function window is pressed, a mode memory window is opened (see FIG. 12). An arbitrary key (in this case, M1 key) among the memory key group 901 is pressed in the "mode memory window" shown in FIG. 12, the window changes to a state shown in FIG. 12. An "OK" key 1201 is pressed to start reproduction.

Contents (copying machine registration contents 1) shown in FIG. 13 are registered in the copying machine 101 for each function. Copying machine registration contents 1 (1300) include a function registration column 1301, and a detailed function registration column 1302 which describes "detailed functions" of a "function" registered in the function registration column 1301. Copying machine registration contents 1 (1300) also include a window registration column 1303 which describes a "window name" (window identification information) for setting detailed functions, and a previous window registration column 1304 which describes a "previous window name" (previous window identification information) as information representing the display order.

Reproduction processing is done on the basis of user registration contents 1 (1100) shown in FIG. 11 and copying machine registration contents 1 (1300) shown in FIG. 13. Pieces of "both sides" information that are registered in user registration contents 1 (1100) are extracted, and settings are filled in accordance with the both-side setting window order of copying machine registration contents 1 (1300).

More specifically, the "first window for both sides" in FIG. 6 is opened to set "from both sides to both sides" setting information registered in user registration contents 1 (1100). Thereafter, the "second window for both sides" in FIG. 7 is opened. Since user registration contents 1 (1100) hold no setting information but only stop designation, the display stops (see a "second window for invoke" in FIG. 14).

Figure 14:
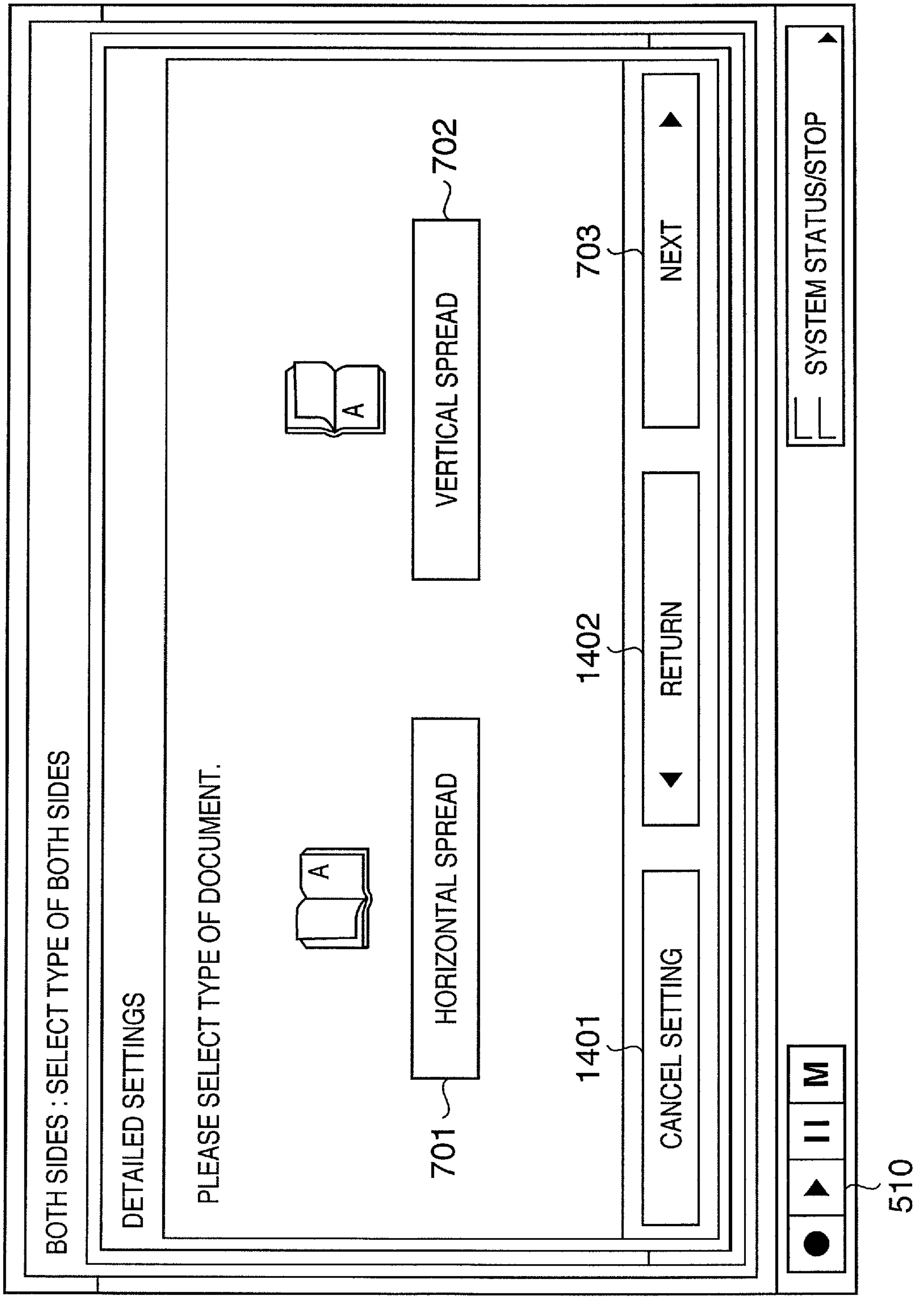
FIG. 14 is a view showing an example of the second window for invoke.

In the second window for invoke shown in FIG. 14, the user selects either the "horizontal spread" key 701 or "vertical spread" key 702, and presses the "playback" key 510 to display the "third window for both sides" in FIG. 8. "Horizontal spread" is set as an output orientation registered in user registration contents 1 (1100). It is obvious from information on the display order in copying machine registration contents 1 (1300) that the "third window for both sides" in FIG. 8 is a final window. After the process reaches the final window, open windows (first to third windows for both sides) are closed.

By pressing a setting cancel key 1401 in the "second window for invoke" in FIG. 14, invocation of registered contents can be stopped. By pressing a return key 1402, the "first window for both sides" in FIG. 6 can be opened to change the type of both sides. If a type different from a currently registered one is selected, the "playback" key 510 is hatched and cannot be pressed. By pressing the "next" key 703, the "third window for both sides" in FIG. 8 is opened to allow selecting the type of both-side copying.

7.3 Flow of Reproduction Processing

Figure 15:
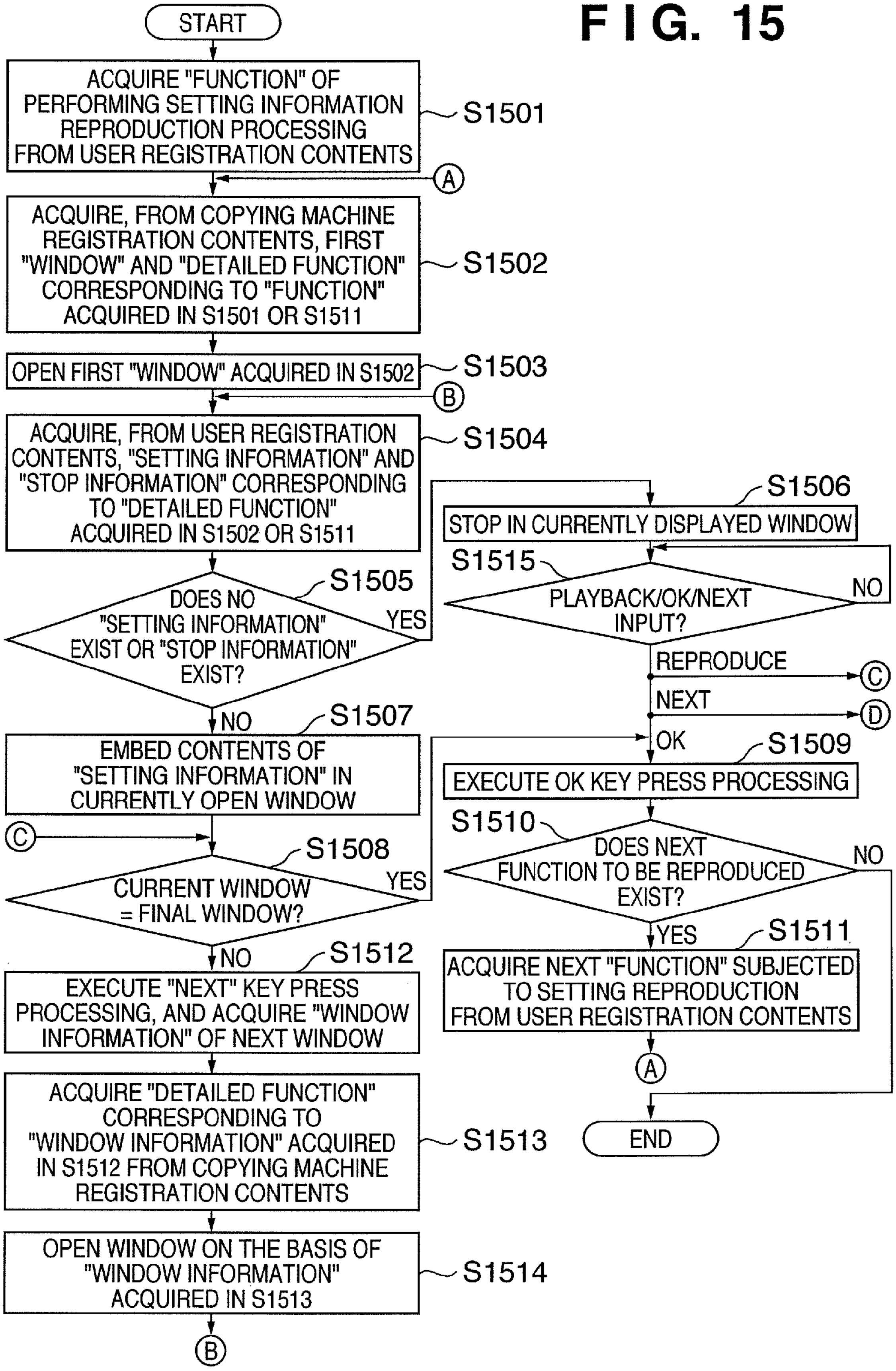
FIG. 15 is a flowchart showing the flow of reproduction processing in the copying machine.

The flow of reproduction processing will be explained with reference to the flowchart of FIG. 15. In step S1501, a "function" for performing setting information reproduction processing is acquired from the function registration column 1101 of user registration contents 1 (1100).

In step S1502, the first "window information" corresponding to the "function" acquired in step S1501, and "detailed functions" corresponding to the window are acquired from the window registration column 1303 and detailed function registration column 1302 of copying machine registration contents 1 (1300) in the copying machine 101.

In step S1503, a window is opened on the basis of the "window information" acquired in step S1502. In step S1504, "setting information" and "stop information" (information representing the stop of recording) corresponding to the "detailed functions" acquired in step S1502 (or step S1511) are acquired from the setting registration column 1103 and stop registration column 1104 of user registration contents 1 (1100).

If no corresponding "setting information" exists or stop information exists in step S1504, the flow stops in the window displayed in step S1503 (step S1505→S1506).

If corresponding "setting information" exists in step S1504, "setting information" described in the setting registration column 1103 is set in the window displayed in step S1503 (step S1505→S1507).

Whether the current window is a final one is determined on the basis of the previous window registration column 1304 of copying machine registration contents 1 (1300). If the current window is a final one, OK key processing is executed (step S1508→S1509).

If the current window is not a final one, "next" key press processing is executed to acquire the next "window information" from the window registration column 1303 (step S1512).

In step S1513, "detailed functions" corresponding to the "window information" acquired in step S1512 are acquired from the detailed function registration column 1302 of copying machine registration contents 1 (1300). In step S1514, a window is opened on the basis of the "window information". The flow is executed from step S1504 for the newly opened window.

7.4 About Processing in Step S1506 (Stop in Currently Displayed Window)

Since setting information for performing reproduction is not acquired, the flow waits for an input from the user. If an input is received, it is determined whether the input is an OK/next/playback key input (step S1515). If the input is the "playback" key, it is determined whether the current window is a final one, and reproduction processing is automatically executed to acquire necessary setting information from the next window.

If the input is the "next" key, "next" key press processing is executed (step S1512). If the input is the "OK" key, OK key press processing is executed (step S1509).

7.5 About Processing in Step S1508 (Current Window is Final One)

"OK" key press processing is automatically executed to determine whether the next "function" to be reproduced exists in user registration contents 1 (1100) (step S1510). If the next "function" exists, the "function" is acquired from the function registration column 1101, and the flow is executed from step S1502 (step S1511).

If no next "function" to be reproduced exists, reproduction processing ends, and the flow waits for a start command input from the user.

As is apparent from the above description, according to the first embodiment, recording of setting information input operation by the user can be stopped at an arbitrary location. When the user wants to change and set only some of setting items to be input, he stops recording operation for the desired setting items in recording. In reproduction, the user can arbitrarily input settings to the desired setting items, improving user friendliness.

SECOND EMBODIMENT

In the first embodiment, the next window to be displayed is determined regardless of setting contents in a predetermined window. However, the present invention is not limited to this, and can also be applied to a case wherein, for example, window display is controlled to change a subsequent window depending on setting contents.

More specifically, according to the first embodiment, when it is determined in reproduction processing that stop information has been recorded for a predetermined function, the user is prompted to input setting information. After setting information is input, the input setting information is set. To the contrary, according to the second embodiment, when it is determined in reproduction processing that no setting information has been recorded for a predetermined function (it is determined that the setting registration column holds NULL information), the user is prompted to input setting information. In this way, even if a subsequent window changes depending on setting contents, no registration processing need be done for all subsequent windows, improving user friendliness. This processing will be explained with reference to FIG. 16.

Figure 16:
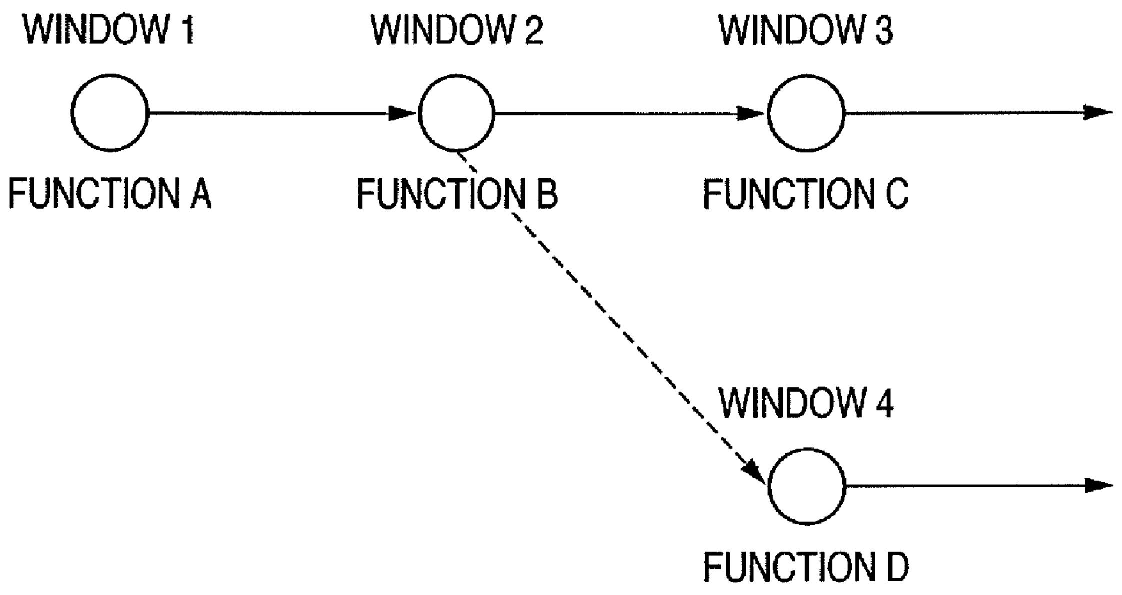
FIG. 16 is a view abstractly showing various functions of the copying machine and windows used to set setting information for the respective functions, and showing a state in which the window branches to different windows on the basis of the setting contents of respective windows.

FIG. 16 is a view abstractly showing various functions of a copying machine 101 and windows used to set setting information for the respective functions. FIG. 16 illustrates a state in which the window branches to different windows on the basis of the setting contents of respective windows.

Window 1 is used to set function A. The "next" key is pressed in window 1 to open window 2 for setting function B. Similarly, the "next" key is pressed in window 2 to open window 3 or 4 depending on the setting contents of function B.

Assume that in registration processing, the user presses the "pause" key in window 2/function B, and registers subsequent setting information in window 3/function C. Further, assume that in reproduction processing, the user inputs setting information in window 2/function B so as to shift to window 4/function D.

In this case, since no setting information is recorded for window 4/function D, the flow pauses to prompt the user to input setting information for function D.

THIRD EMBODIMENT

In the first and second embodiments, user registration contents are stored in the main body of the copying machine 101. However, the present invention is not limited to this. For example, user registration contents may be held in the client computer 105 or saved in an ID card (not shown). In this case, the user registration contents in a specific copying machine can also be applied to another copying machine.

Similar to the second embodiment, when it is determined in reproduction processing that no setting information has been recorded for a predetermined function (it is determined that the setting registration column holds NULL information), the user is prompted to input setting information. With this configuration, even when the functions of a specific copying machine and those of another copying machine are different, user registration contents in the specific copying machine can also be applied to another copying machine.

A case wherein reproduction processing is done in a copying machine 102 on the basis of setting information held in a client computer 105 or setting information saved in an ID card, and the detailed functions of the copying machine 102 are larger in number than those of a copying machine 101 will be explained.

Registration contents held in the client computer 105 or ID card are defined as user registration contents 2 (1700) in FIG. 17. Registration contents held in the copying machine 102 are defined as copying machine registration contents 2 (1800) in FIG. 18.

Function A means a large item of function classification. User registration contents 2 (1700) include setting information on detailed functions A-1/A-2/A-4, and pause in settings of detailed function A-2.

Copying machine registration contents 2 (1800) hold information on detailed functions A-1/A-2/A-3/A-4, windows for performing detailed settings, and windows previous to the windows.

In this configuration, when reproduction processing is executed using user registration contents 2 (1700) in the copying machine 102 which holds copying machine registration contents 2 (1800), not only the second window for A→detailed function A-2 to be stopped by the user, but also the third window for A→detailed function A-3 not contained in user registration contents 2 (1700) are paused. If the user inputs detailed function A-3, reproduction processing resumes and advances to the next fourth window for A to set detailed function A-4. Note that setting information input by the user in the third window for A is registered in user registration contents 2 (1700).

As is apparent from the above description, according to the third embodiment, setting information can be held in an external device, ID card, and the like, in addition to a copying machine, and reproduction processing can be done using the setting information. Even if available functions are different between copying machines, setting information registered in advance can be set (setting information recorded in the copying machine 101 can be reproduced in the copying machine 102 having different functions). As a result, user friendliness improves, compared to a conventional copying machine.

OTHER EMBODIMENT

The present invention may be applied to a system including a plurality of devices (e.g., a host computer, interface device, reader, and printer) or an apparatus including a single device (e.g., a copying machine or facsimile apparatus).

The object of the present invention is achieved even by supplying a storage medium which stores software program codes to implement the functions of the above-described embodiments to the system or apparatus. In this case, the functions are implemented by causing the computer (or CPU or MPU) of the system or apparatus to read out and execute the program codes stored in the storage medium. In this case, the storage medium which stores the program codes constitutes the present invention.

As the storage medium to supply the program codes, for example, a floppy® disk, hard disk, optical disk, magnetooptical disk, CD-ROM, CD-R, magnetic tape, nonvolatile memory card, or ROM can be used.

The functions of the above-described embodiments are implemented when the read-out program codes are executed by the computer. Also, the present invention includes a case wherein an OS (Operating System) or the like running on the computer performs part or all of actual processing on the basis of the instructions of the program codes and thereby implements the functions of the above-described embodiments.

Furthermore, the present invention includes a case wherein the functions of the above-described embodiments are implemented after the program codes read out from the storage medium are written in the memory of a function expansion board inserted into the computer or the memory of a function expansion unit connected to the computer. That is, the present invention includes a case wherein, after the program codes are written in the memory, the CPU of the function expansion board or function expansion unit performs part or all of actual processing on the basis of the instructions of the program codes and thereby implements the functions of the above-described embodiments.

The present invention is not limited to the above embodiments and various changes and modifications can be made within the spirit and scope of the present invention. Therefore to apprise the public of the scope of the present invention, the following claims are made.

This application claims the benefit of Japanese Application No. 2005-021822 filed Jan. 28, 2005, which is hereby incorporated by reference herein in its entirety.

What is claimed is:

1. An image processing apparatus that has a plurality of functions for image processing and performs image processing using setting information set for each function, comprising:

- a display unit configured to sequentially display each of a plurality of operation screens in accordance with a predetermined display order, wherein each of the plurality of operation screens displays setting items for inputting setting information set to be used for performing one of the plurality of functions;
- a setting information input unit configured to accept a plurality of pieces of setting information set to be used for performing each of the plurality of functions on respective ones of the plurality of operation screens displayed in accordance with the predetermined display order;
- a storage unit configured to, in a case where a user issues a storing instruction, store the plurality of pieces of setting information that is accepted by the setting information input unit corresponding to the setting items displayed on each of the plurality of operation screens, wherein, when the setting information input unit does not accept an input of setting information corresponding to the setting items displayed on any of the plurality of operation screens, the storage unit does not store the setting information corresponding to the setting items; and a setting control unit configured to control the display unit so as to sequentially display each of the plurality of operation screens in accordance with the predetermined display order, and, automatically set setting information stored in the storage unit in the setting items included in each of the plurality of operation screens displayed by the display unit in response to a setting instruction from the user, wherein, in a case where the setting information to be set in the setting items displayed on the operation screen has been stored in the storage unit, the setting control unit inputs the stored setting information to the setting items and then controls the display unit so as to shift to a succeeding one of the operation screens, and, in a case where the setting information to be set in the setting items displayed on the operation screen has not been stored in the storage unit, the setting control unit controls the display unit so as to continue to display the operation screen until the user inputs the setting information to the setting items without shifting to a succeeding one of the operation screens, and wherein a setting process controlled by the setting control unit for performing one of the plurality of functions is completed by being set with the setting information that is automatically input to the setting items, in a case where the setting information to be set in the setting items has been stored in the storage unit, or is completed by being set with the setting information that is input by the user to the setting items, in a case where the setting information to be set in the setting items has not been stored in the storage unit.

2. The apparatus according to claim 1, wherein information on the display order includes screen identification information for identifying the screen, a function of inputting setting information on the screen, and previous screen identification information for identifying a previous screen displayed before shift to the screen.

3. A control method in an image processing apparatus that has a plurality of functions for image processing and performs image processing using setting information set for each function, comprising steps of:

sequentially displaying each of a plurality of operation screens by a display unit in accordance with a predetermined display order, wherein the each of the plurality of operation screens displays setting items for inputting setting information set to be used for performing one of the plurality of functions;

accepting a plurality of pieces of setting information set to be used for performing each of the plurality of functions on respective ones of the plurality of operation screens displayed in accordance with the predetermined display order;

storing, in a case where a user issues a storing instruction, the plurality of pieces of the setting information that is accepted in the setting information input step corresponding to the setting items displayed on each of the plurality of operation screens, wherein when an input of setting information corresponding to the setting items displayed on any of the plurality of operation screens is not accepted in the setting information input step, the setting information corresponding to the setting items is not stored in the storage step; and controlling the display unit so as to sequentially display each of the plurality of operation screens in accordance with the predetermined display order and setting, automatically, setting information stored in the storing step in the setting items included in each of the plurality of operation screens displayed in the displaying step in response to a setting instruction from the user, wherein, in a case where the setting information set to be set in the setting items displayed on the operation screen has been in the storing step, the controlling step controls to input the stored setting information to the setting items and then controls the display unit so as to shift to a next operation screen, and, in a case where the setting information to be set in the setting items displayed on the operation screen has not been stored in the storage step, the controlling step controls the display unit so as to continue to display the operation screen until the user inputs the setting information to the setting items without shifting to succeeding one of the operation screens, and wherein a setting process controlled in the controlling step for performing one of the plurality of functions is completed by being set with the setting information that is automatically input to the setting items, in a case where the setting information to be set in the setting items has been stored in the storing step, or is completed by being set with the setting information that is input by the user to the setting items, in a case where the setting information to be set in the setting items has not been stored in the storage step.

4. A non-transitory computer-readable storage medium storing a computer program for a method performed by an image processing apparatus that has a plurality of functions for image processing and performs image processing using setting information set for each function, the method comprising steps of:

sequentially displaying each of a plurality of operation screens by a display unit in accordance with a predetermined display order, wherein the each of the plurality of operation screens displays setting items for inputting setting information set to be used for performing one of the plurality of functions;

accepting a plurality of pieces of setting information set to be used for performing each of the plurality of functions on respective ones of the plurality of operation screens displayed in accordance with the predetermined display order;

storing, in a case where a user issues a storing instruction, the plurality of pieces of the setting information that is accepted in the setting information input step corresponding to the setting items displayed on each of the plurality of operation screens, wherein when an input of setting information corresponding to the setting items displayed on any of the plurality of operation screens is not accepted in the setting information input step, the setting information corresponding to the setting items is not stored in the storage step; and controlling the display unit so as to sequentially display each of the plurality of operation screens in accordance with the predetermined display order and setting, automatically, setting information stored in the storing step in the setting items included in each of the plurality of operation screens displayed in the displaying step in response to a setting instruction from the user, wherein, in a case where the setting information set to be set in the setting items displayed on the operation screen has been stored in the storing step, the controlling step controls to input the stored setting information to the setting items and then controls the display unit so as to shift to a next operation screen, and, in a case where the setting information to be set in the setting items displayed on the operation screen has not been stored in the storage step, the controlling step controls the display unit so as to continue to display the operation screen until the user inputs the setting information to the setting items without shifting to succeeding one of the operation screens, and wherein a setting process controlled in the controlling step for performing one of the plurality of functions is completed by being set with the setting information that is automatically input to the setting items, in a case where the setting information to be set in the setting items has been stored in the storing step, or is completed by being set with the setting information that is input by the user to the setting items, in a case where the setting information to be set in the setting items has not been stored in the storage step.

* * * * *